US007027948B2

(12) United States Patent
Mikami

(10) Patent No.: US 7,027,948 B2
(45) Date of Patent: Apr. 11, 2006

(54) TESTING APPARATUS, METHOD OF CONTROLLING THE SAME, AND PROGRAM FOR IMPLEMENTING THE METHOD

(75) Inventor: Ruriko Mikami, Kanagawa (JP)

(73) Assignee: Canon Kabushiki Kaisha, (JP)

( * ) Notice: Subject to any disclaimer, the term of this patent is extended or adjusted under 35 U.S.C. 154(b) by 61 days.

(21) Appl. No.: 10/839,038

(22) Filed: May 5, 2004

(65) Prior Publication Data

US 2004/0225466 A1 Nov. 11, 2004

(30) Foreign Application Priority Data

May 9, 2003 (JP) ............................ 2003-132139

(51) Int. Cl.
*G06F 19/00* (2006.01)

(52) U.S. Cl. ...................... 702/120; 702/123; 702/189; 702/117; 710/15; 710/20; 710/48; 73/865.9; 324/76.11; 700/1; 700/28; 700/32

(58) Field of Classification Search ................ 702/120, 702/123, 189, 117; 710/15, 20, 48; 73/865.9; 324/76.11; 700/1, 28, 32

See application file for complete search history.

(56) References Cited

U.S. PATENT DOCUMENTS 5,583,430 A * 12/1996 Dinteman ................ 324/158.1
2003/0056036 A1* 3/2003 Carlton ........................ 710/15
2004/0059536 A1* 3/2004 Chang et al. ............... 702/120

FOREIGN PATENT DOCUMENTS

JP 6-214817 A 8/1994

OTHER PUBLICATIONS

Martin et al., 'Expert System for Diagnosing Equipment Failures', 1998, University of Arkansas, pp. 1169-1174.*
Kitagaki, 'Flexible ATE Module with Reconfigurable Circuit and Its Application', 1999, IEEE Publication, Paper 352, pp. 940-946.*
Swail, 'Using Device ATE Testers to Solve System Anomalies', 2002, IEEE Publication, pp. 650-660.*
Guven et al., 'A Microprocessor-Based Portable Test Equipment for Electricity Network', May 10, 2004, IEEE Publication, pp. 1103-1106.*

* cited by examiner

*Primary Examiner*—Marc S. Hoff
*Assistant Examiner*—Elias Desta
(74) *Attorney, Agent, or Firm*—Rossi, Kimms & McDowell, LLP

(57) ABSTRACT

A testing apparatus which, when resuming a test after interruption, makes it possible to determine whether or not an apparatus to be tested is the one for which the test has been interrupted. A controller acquires identification information for identifying the apparatus to be tested. The controller carries out a test comprised of a plurality of testing items to be executed on the apparatus to be tested. When the test is interrupted, a recording section is operable to record resuming information for carrying out the test on unexecuted testing items among the plurality of testing items, and the acquired identification information.

11 Claims, 9 Drawing Sheets

TESTING APPARATUS, METHOD OF CONTROLLING THE SAME, AND PROGRAM FOR IMPLEMENTING THE METHOD

BACKGROUND OF THE INVENTION

1. Field of the Invention

The present invention relates to a testing apparatus which tests products having a communicating function, a user interface function, and a printing function, a method of controlling the testing apparatus, and a program for implementing the method. In particular, the present invention relates to a testing apparatus which has a function of interrupting a test and a function of resuming a test after interruption, a method of controlling the testing apparatus, and a program for implementing the method.

2. Description of the Related Art

In recent years, a testing apparatus which tests a product (an apparatus to be tested) having a communicating function, a user interface function, and a printing function, such as a copying machine, a facsimile machine, or a multifunction apparatus, has been implemented by a computer, which carries out an automated test on the apparatus to be tested, and records information on the result of the test (refer to Japanese Laid-Open Patent Publication (Kokai) No. H06-214817, for example).

The testing apparatus implemented by the computer as above is capable of transmitting test data to the apparatus to be tested which is connected thereto via a communication cable such as a USB cable, but is not capable of making a determination as to the acceptability of the apparatus to be tested by checking the compatibility of a user interface of the apparatus to be tested with the test data and/or a printout of the test data output from the apparatus to be tested, and therefore, the tester has to manually make a determination as to the acceptability of the apparatus to be tested. For this reason, it takes a long time to complete a test on all testing items, and also, during the test, the tester is tied to the testing apparatus so as to make a determination as to the acceptability of the apparatus to be tested. The period of time for which the tester is tied to the apparatus to be tested is limited, and hence a testing apparatus has been proposed which has a function of enabling the tester to interrupt a test and a function of enabling the tester to resume a test after interruption.

However, in the testing apparatus which has the test interrupting function and the test resuming function as above, when the tester resumes a test after interruption, the apparatus to be tested should be the one for which the test has been interrupted, but if one tester carries out a test on a plurality of apparatuses to be tested, there may be the case where he/she cannot recognize which apparatus has been tested at the time of interruption when resuming the test. In this case, there is a possibility that test result information which is comprised of information indicative of test results on one apparatus to be tested on testing items executed before interruption, and information indicative of test results on another apparatus to be tested on testing items executed after resumption is recorded despite the tester's intent, and therefore, the reliability of test result information which is recorded cannot be ensured.

Also, if one apparatus to be tested cannot pass a test on a certain testing item among a plurality of testing items, there is a possibility that the tester intentionally causes another apparatus to be tested to pass the test on the testing item, and therefore, the security of testing cannot be ensured. For this reason, the testing apparatus is required to identify an apparatus to be tested when resuming a test.

SUMMARY OF THE INVENTION

It is an object of the present invention to provide a testing apparatus and a method of controlling the same which, when resuming a test after interruption, make it possible to determine whether or not an apparatus to be tested is the one for which the test has been interrupted, and a program for implementing the method.

To attain the above object, in a first aspect of the present invention, there is provided a testing apparatus connected to an apparatus to be tested, for testing the apparatus to be tested, comprising an acquisition device that acquires identification information for identifying the apparatus to be tested, a testing device that carries out a test comprising a plurality of testing items to be executed on the apparatus to be tested, and a recording device operable when the test is interrupted, to record resuming information for carrying out the test on unexecuted testing items among the plurality of testing items, and the identification information acquired by the acquisition device.

According to the construction of the first aspect according to the present invention, when a test is interrupted, identification information for identifying an apparatus to be tested and resuming information for carrying out a test on unexecuted testing items among a plurality of testing items are recorded. As a result, when a test is resumed after interruption, it is possible to determine whether or not an apparatus to be tested is the one for which the test has been interrupted.

Preferably, the recording device records encrypted information in each of the testing apparatus and the apparatus to be tested.

Preferably, the testing apparatus further comprises a second acquisition device that acquires identification information on the apparatus to be tested when resuming the interrupted test, a determination device that determines whether the identification information recorded by the recording device and the identification information acquired by the second acquisition device coincide with each other, and a resuming device that resumes the test according to the resuming information when the identification information recorded by the recording device and the identification information acquired by the second acquisition device coincide with each other.

According to the above preferred construction, when a test is resumed after interruption, it is possible to surely determine whether or not an apparatus to be tested is the one for which the test has been interrupted.

More preferably, the testing apparatus further comprises a determination device that determines whether to resume the interrupted test according to the encrypted information recorded in the testing apparatus and the encrypted information recorded in the apparatus to be tested.

Preferably, the testing apparatus further comprises a second recording device operable when the test has been completed on one testing item among the plurality of testing items, to record a test result on the one testing item.

To attain the above object, in a second aspect of the present invention, there is provided a method of controlling a testing apparatus which is connected to an apparatus to be tested, for testing the apparatus to be tested, comprising an acquisition step of acquiring identification information for identifying the apparatus to be tested, a testing step of carrying out a test comprising a plurality of testing items to be executed on the apparatus to be tested, and a recording step of recording resuming information for carrying out the test on unexecuted testing items among the plurality of testing items, and the identification information acquired in the acquisition step when the test is interrupted.

Preferably, the recording step comprises recording encrypted information in each of the testing apparatus and the apparatus to be tested.

Preferably, the method of controlling a testing apparatus further comprises a second acquisition step of acquiring identification information on the apparatus to be tested when resuming the interrupted test, a determination step of determining whether the identification information recorded in the recording step and the identification information acquired in the second acquisition step coincide with each other, and a resuming step of resuming the test according to the resuming information when the identification information recorded in the recording step and the identification information acquired in the second acquisition step coincide with each other.

More preferably, the method of controlling a testing apparatus further comprises a determination step of determining whether to resume the interrupted test according to the encrypted information recorded in the testing apparatus and the encrypted information recorded in the apparatus to be tested.

Preferably, the method of controlling a testing apparatus further comprises a second recording step of recording a test result on one testing item among the plurality of testing items when the test has been completed on the one testing item.

To attain the above object, in a third aspect of the present invention, there is provided a program for causing a computer to execute a method of controlling a testing apparatus which is connected to an apparatus to be tested, for testing the apparatus to be tested, comprising an acquisition module for acquiring identification information for identifying the apparatus to be tested, a testing module for carrying out a test comprising a plurality of testing items to be executed on the apparatus to be tested; and a recording module for recording resuming information for carrying out the test on unexecuted testing items among the plurality of testing items, and the identification information acquired by the acquisition module when the test is interrupted.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
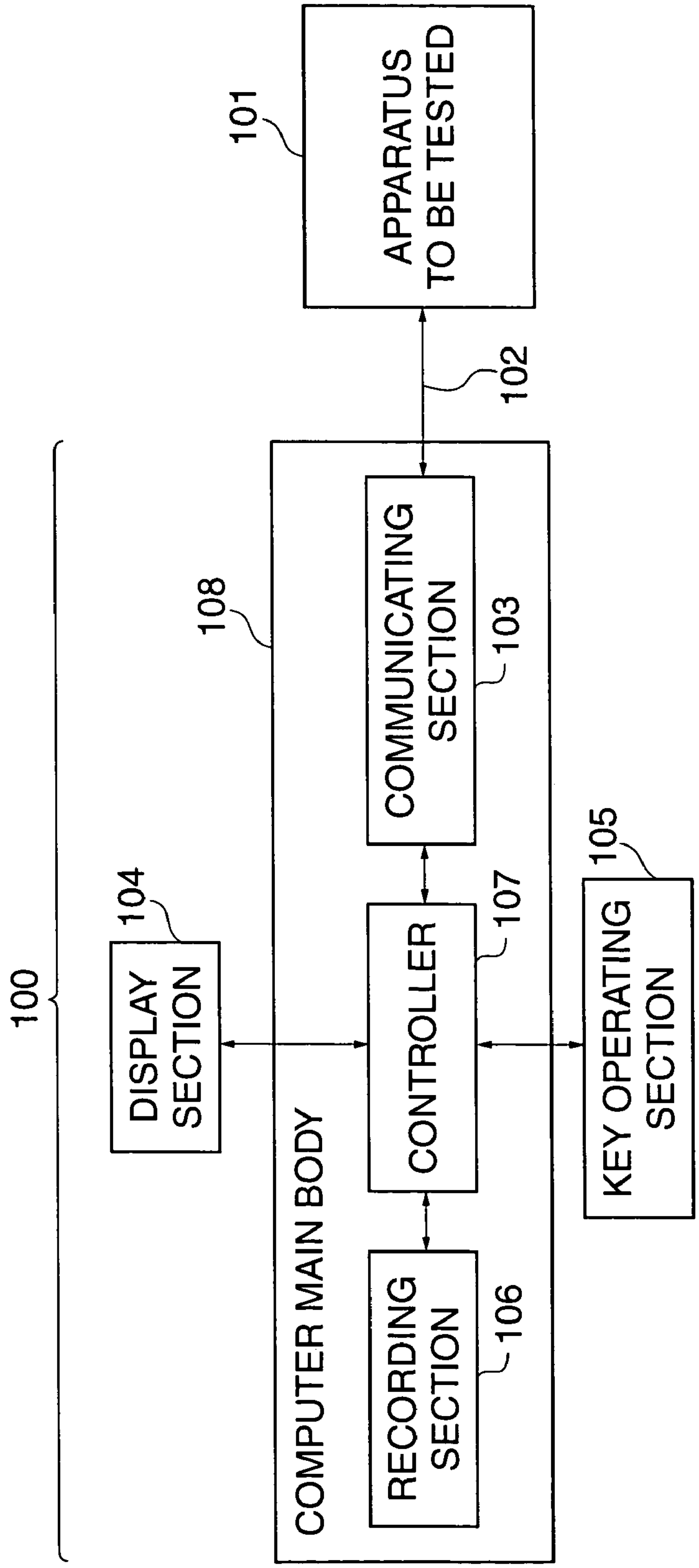
FIG. 1 is a block diagram showing the internal construction of a testing apparatus according to an embodiment of the present invention.

FIG. 1 is a block diagram showing the internal construction of a testing apparatus according to an embodiment of the present invention.

In FIG. 1, a computer 100 as the testing apparatus according to the embodiment is comprised of a display section 104 (FIG. 2) which displays test result information, a menu for carrying out a test starting operation, a menu for carrying out a test interrupting operation, and a menu for carrying out a test resuming operation; a key operating section 105 through which the tester gives operating instructions with reference to the menus displayed in the display section 104, and a computer main body 108.

The computer main body 108 is comprised of a communicating section 103 which carries out communication with an apparatus to be tested 101; a recording section 106 which records test result information acquired before interruption and identification information on an apparatus to be tested, which are used in resuming a test; and a controller 107 which provides interrupting control to interrupt a test, provides recording control to record test result information and identification information on an apparatus to be tested, which are obtained before interruption caused by interrupting control, provides resuming control to resume a test, determines whether or not an apparatus to be tested for which a test is to be resumed is the identical apparatus to be tested for which the test has been interrupted, and determines whether to resume a test or not.

The communicating section 103 is connected to the apparatus to be tested 101 via a communication cable 102, for establishing connection between the computer 100 and the apparatus to be tested 101.

The controller 107 is provided with a memory, not shown, which store programs to be executed by the computer 100, and a CPU, not shown, which reads and executes the programs.

Therefore, the controller 107 is capable of carrying out a test comprised of a plurality of testing items on the apparatus to be tested 101, recording the result of the test in the recording section 106, recording resuming information for resuming the test on testing items which have not yet been executed at the time of resumption among the plurality of testing items in the recording section 106, holding encrypted information in the computer 100, recording resuming information in the apparatus to be tested 101, controlling the communicating section 103 to acquire identification information on the apparatus to be tested 101, and providing control associated with the resumption.

Figure 2:
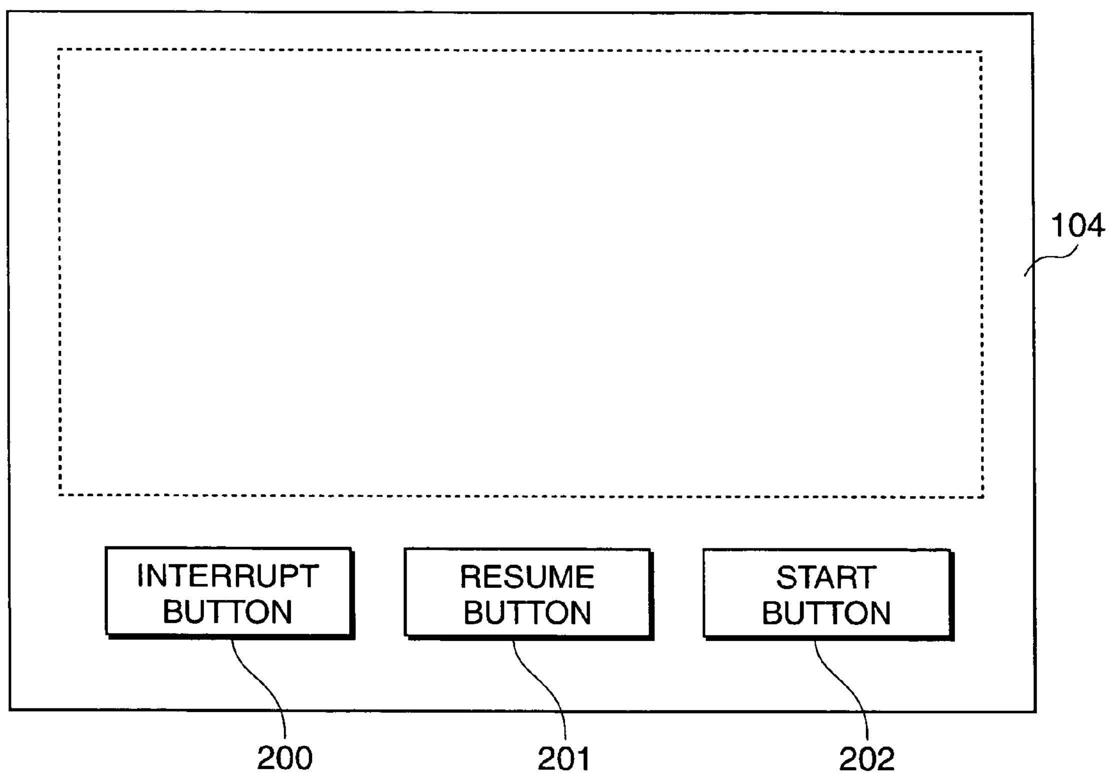
FIG. 2 is a view showing the panel layout of a display section 104.

FIG. 2 is a view showing the panel layout of the display section 104 appearing in FIG. 1.

In FIG. 2, the display section 104 displays menus for carrying out a test starting operation, a test interrupting operation, and a test resuming operation. A start button 202 is depressed to give an instruction for carrying out the test starting operation. An interrupt button 200 is depressed to give an instruction for carrying out the test interrupting operation. When the interrupt button 200 is depressed, the controller 107 provides control to interrupt a test, and record test result information acquired before interruption and identification information on an apparatus to be tested which is connected to the computer 100.

A resume button 201 is depressed to give an instruction for carrying out the test resuming operation. When the resume button 201 is depressed, the controller 107 controls the communicating section 103 to acquire identification information on an apparatus to be tested which is connected to the computer 100, and performs processing, described later, to determine whether or not the acquired identification information coincides with identification information recorded in the recording section 106 at the time of interruption.

Figure 3:
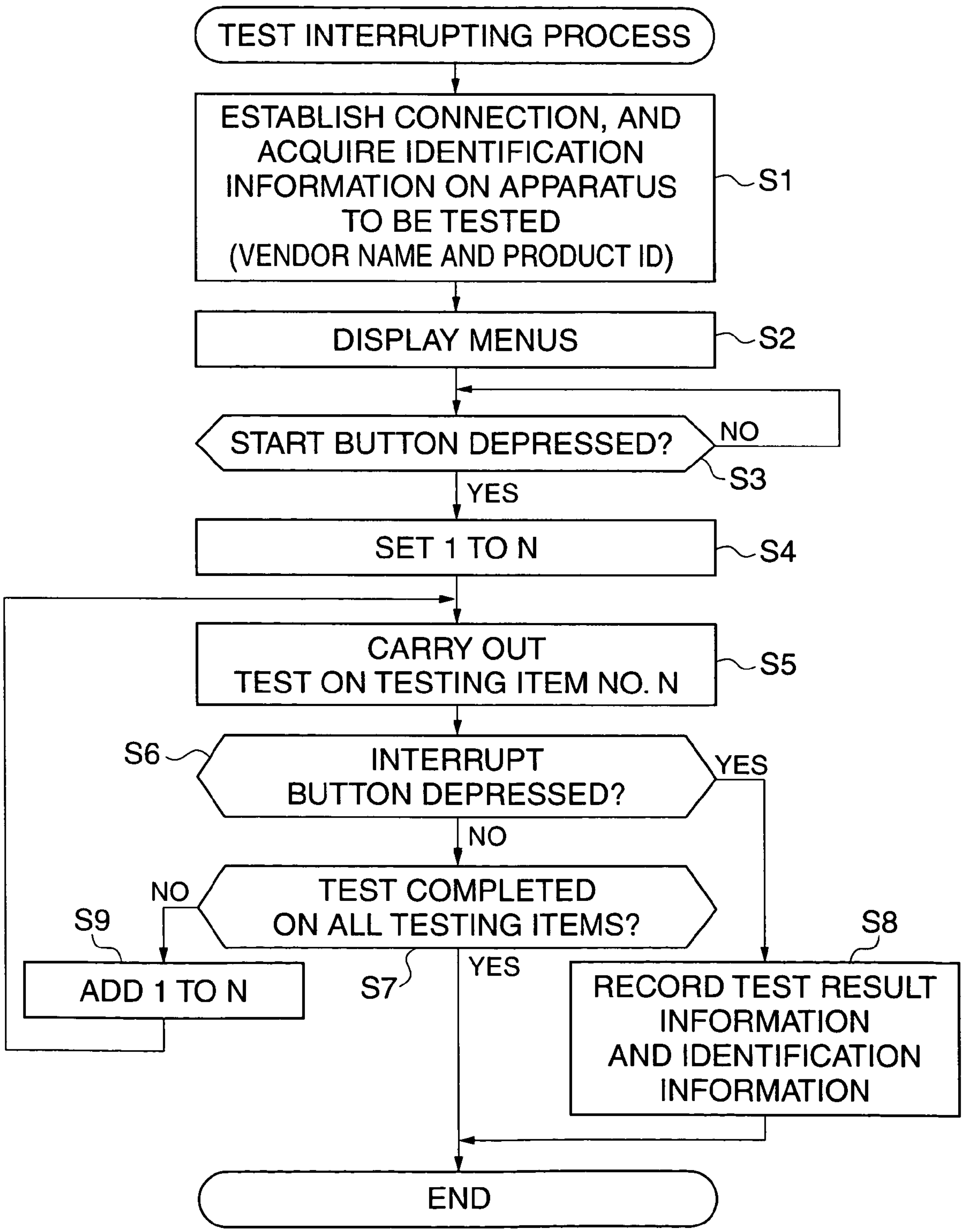
FIG. 3 is a flow chart showing a test interrupting process carried out by a computer 100 appearing in FIG. 1.

FIG. 3 is a flow chart showing a test interrupting process carried out by the computer 100 appearing in FIG. 1.

In FIG. 3, when detecting that the computer 100 and the apparatus to be tested 100 have been connected with each other via the communication cable 102 as shown in FIG. 1, the controller 107 causes the communicating section 103 to establish connection with the apparatus to be tested 100 to acquire a vendor name and a product ID as identification information on the apparatus to be tested 101 (step S1), and causes the display section 104 to show a menu for carrying out a test interrupting operation and a menu for carrying out a test starting operation (step S2).

Then, the controller 107 determines whether or not the start button 202 has been depressed on the menus displayed in the display section 104 (step S3), and if yes, the controller 107 sets 1 to a variable N (step S4). The test is comprised of a plurality of testing items No. 1 to No. n (n is an arbitrary number). Then, the controller 107 carries out a test on a testing item No. N (step S5), and determines whether or not the interrupt button 200 has been depressed on the menus displayed in the display section 104 (step S6).

If it is determined in the step S6 that the interrupt button 200 has not been depressed, it is then determined whether or not the test has been completed on all the testing items (n) ($N \geqq n$) (step S7). If the test has been completed on all the testing items ($N \geqq n$), the process is terminated, and if the test has not been completed on all the testing items ($N<n$), 1 is added to the variable N (step S9), so that the steps S5 and the subsequent steps are executed again.

If it is determined in the step S6 that the interrupt button 200 has been depressed, the controller 107 records test result information on the testing items No. 1 to No. N, and the identification information on the apparatus to be tested 101, which has been acquired in the step S1, in the recording section 106 (step S8). The process is then terminated.

Figure 4A:
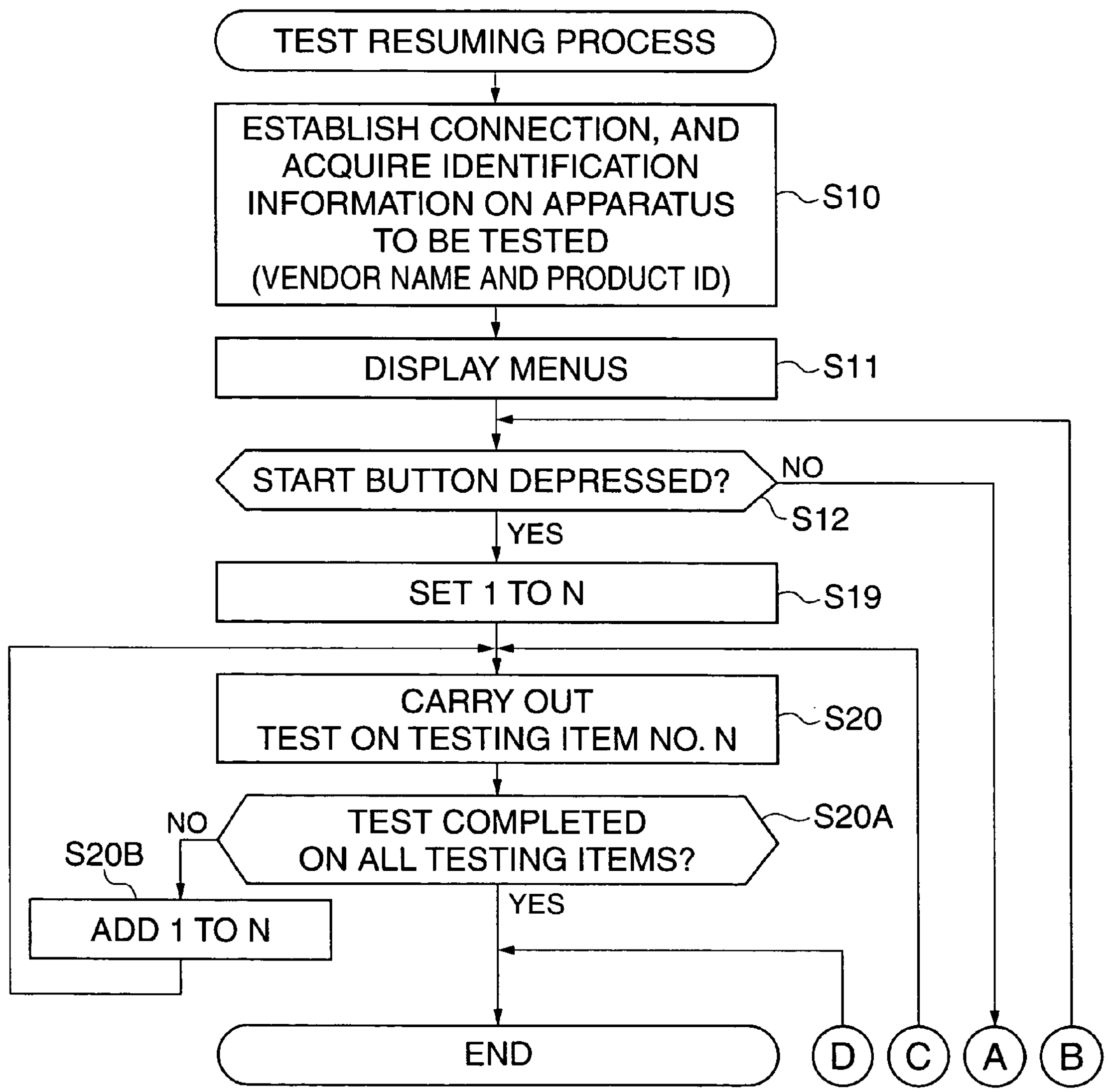
FIGS. 4A and 4B are flow chart showing a test resuming process carried out by the computer 100.
Figure 4B:
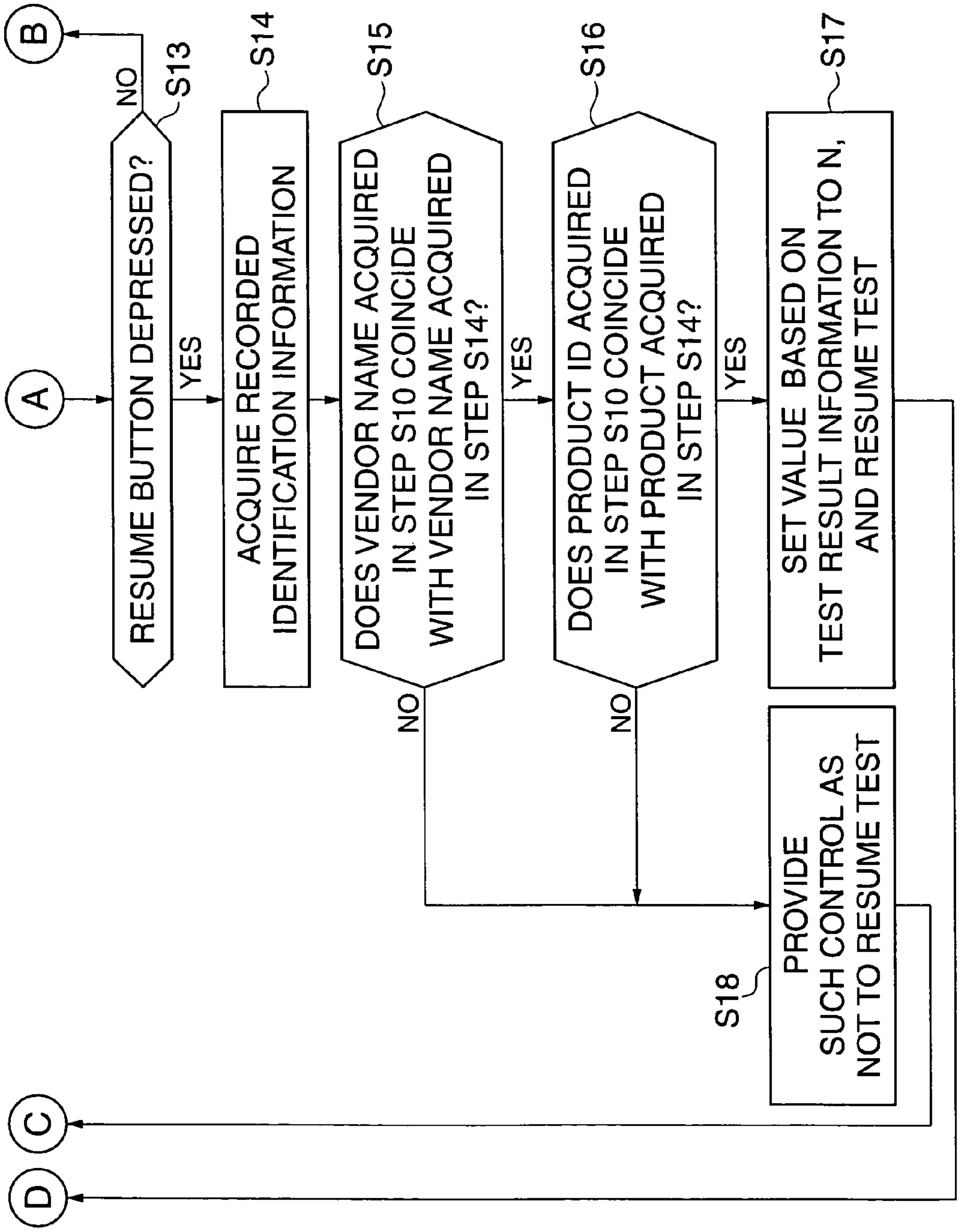

FIGS. 4A and 4B are flow chart showing a test resuming process carried out by the computer 100 appearing in FIG. 1.

In FIG. 4A, when detecting that the computer 100 and the apparatus to be tested 100 have been connected with each other via the communication cable 102 as shown in FIG. 1, the controller 107 causes the communicating section 103 to establish connection with the apparatus to be tested 100 to acquire a vendor name and a product ID as identification information on the apparatus to be tested 101 (step S10). Then, the controller 107 causes the display section 104 to show a menu for carrying out a test interrupting operation and a menu for carrying out a test resuming operation (step S11), and determines whether or not the start button 202 has been depressed on the menus displayed in the display section 104 (step S12).

If it is determined in the step S12 that the start button 202 has not been depressed, the controller 107 determines whether or not the resume button 201 has been depressed on the menus displayed in the display section 104 (step S13). If the resume button 201 has not been depressed, the process returns to the step S12.

If it is determined in the step S13 that the resume button 201 has been depressed, the controller 107 retrieves identification information recorded in the recording section 106 (step S14). Then, the controller 107 determines whether or not a vendor name contained in the identification information retrieved in the step S14 and the vendor name acquired in the step S10 coincide with each other (step S15), and then determines whether or not a product ID contained in the identification information retrieved in the step S14 and the product ID acquired in the step S10 coincide with each other (step S16).

If it is determined in the steps S15 and S16 that the vender name contained in the identification information retrieved in the step S14 and the vendor name acquired in the step S10 coincide with each other, and the product ID contained in the identification information retrieved in the step S14 and the product ID acquired in the step S10 coincide with each other, the controller 107 sets a value based on test result information recorded in the recording section 106 to the variable N, and the test is resumed with a testing item No. N (step S17). The controller 107 then carries outs the test on the testing item No. N (step S20), and determines whether or not the test has been completed on all the testing items (n) ($N \geqq n$) (step S20A). If the test has not been completed on all the testing items ($N<n$), the controller 107 adds 1 to the variable N (step S20B) to execute the step S20 and the subsequent steps or step again, and if the test has been completed on all the testing items ($N \geqq n$), the process is terminated.

If it is determined in the steps S15 and S16 that the vender name contained in the identification information retrieved in the step S14 and the vendor name acquired in the step S10 do not coincide with each other ("NO" to the step S15), and the product ID contained in the identification information retrieved in the step S14 and the product ID acquired in the step S10 do not coincide with each other ("NO" to the step S16), the controller 107 provides such control as not to resume the test (step S18), and the process is terminated.

If it is determined in the step S12 that the start button 202 has been depressed, the controller 107 sets 1 to the variable N (step S19). The test is comprised of a plurality of testing items No. 1 to No. n (n is an arbitrary number). Then, the controller 107 executes the steps S20 and the subsequent steps or step, and the process is terminated.

Although in the present embodiment, when a vender name and a product ID which have been recorded and a vendor name and a product ID of an apparatus to be tested do not coincide with each other, such control is provided as not to resume a test, the identification information should not necessarily be limited to a vendor name and a product ID, but may be various kinds of information such as capability information, a USB product ID, and so forth insofar as it can identify an apparatus to be tested.

Figure 5:
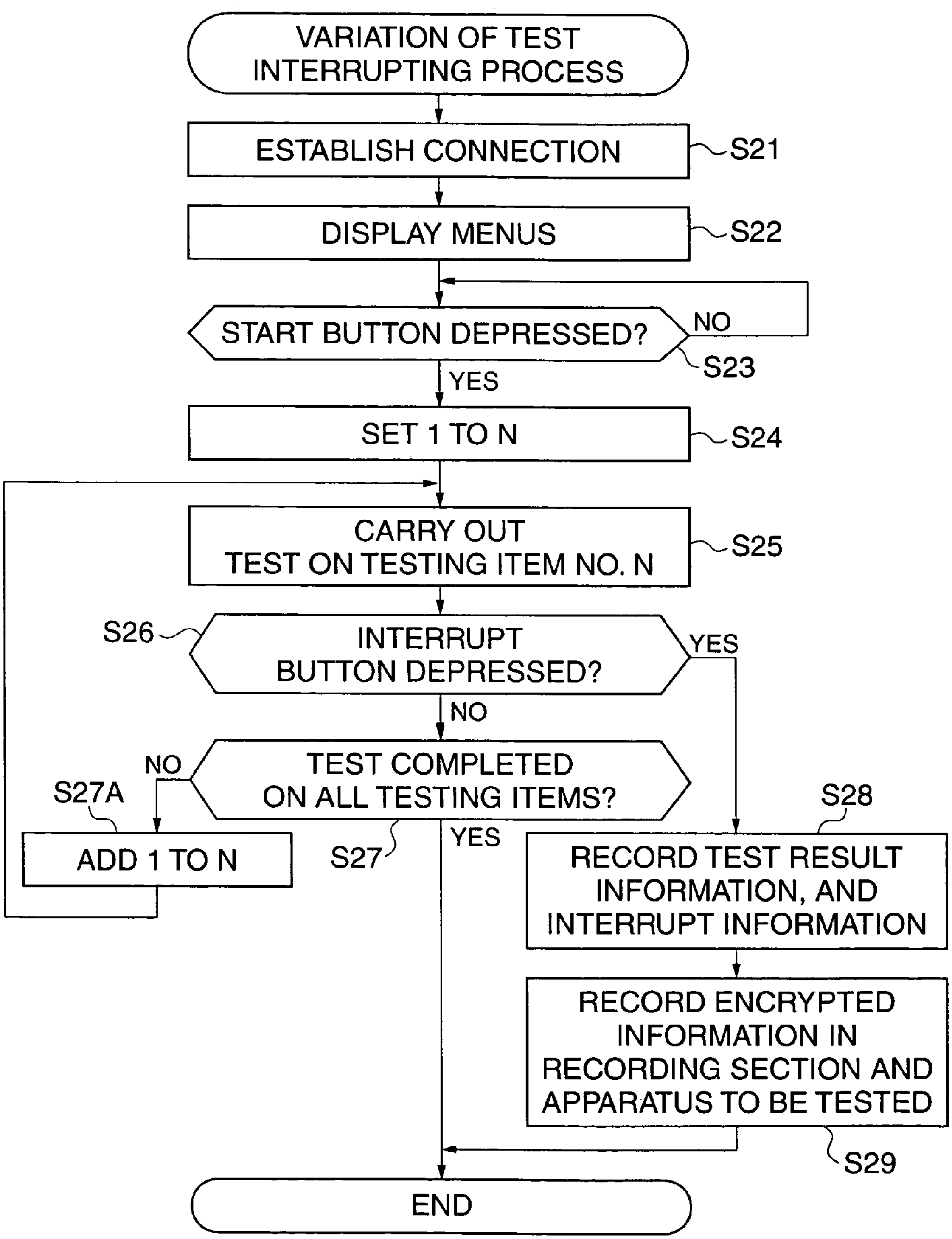
FIG. 5 is a flow chart showing a variation of the test interrupting process.

FIG. 5 is a flow chart showing a variation of the test interrupting process carried out by the computer 100 appearing in FIG. 1.

In FIG. 5, when detecting that the computer 100 and the apparatus to be tested 100 have been connected with each other via the communication cable 102 as shown in FIG. 1, the controller 107 causes the communicating section 103 to establish connection with the apparatus to be tested 100 (step S21), and causes the display section 104 to show a menu for carrying out a test interrupting operation and a menu for carrying out a test starting operation (step S22).

Then, the controller 107 determines whether or not the start button 202 has been depressed on the menus displayed in the display section 104 (step S23). If the start button 202 has been depressed, the controller 107 sets 1 to the variable N (step S24). The test is comprised of a plurality of testing items No. 1 to No. n (n is an arbitrary number). Then, the controller 107 carries out the test on a testing item No. N (step S25), and determines whether or not the interrupt button 200 has been depressed on the menus displayed in the display section 104 (step S26).

If it is determined in the step S26 that the interrupt button 200 has not been depressed, the controller 107 determines whether or not the test has been completed on all the testing items (n) (N≧n) (step S27). If the test has been completed on all the testing items (N≧n), the process is terminated, and if the test has not yet been completed on all the testing items (N<n), the controller 107 adds 1 to the variable N (step S27A) to execute the step S25 and the subsequent steps again.

If it is determined in the step 26 that the interrupt button 200 has been depressed, the controller 107 records test result information on the testing items No. 1 to No. N and resuming information for carrying out the test on testing items which have not yet been executed at the time of resumption among the plurality of testing items in the recording section 106 (step S28). The controller 107 then records encrypted information on the apparatus to be tested 101 in each of the recording section 106 and the apparatus to be tested 101 (step S29), and the process is terminated.

The encrypted information is intended for associating test result information obtained before interruption and resuming information with the concerned apparatus to be tested. For example, a hash value calculated using e.g. a hash function from generated test result information and resuming information can be used as encrypted information. When a test is resumed, test result information and resuming information generated by testing the apparatus to be tested can surely be used for the apparatus to be tested in which encrypted information has been recorded.

Figure 6A:
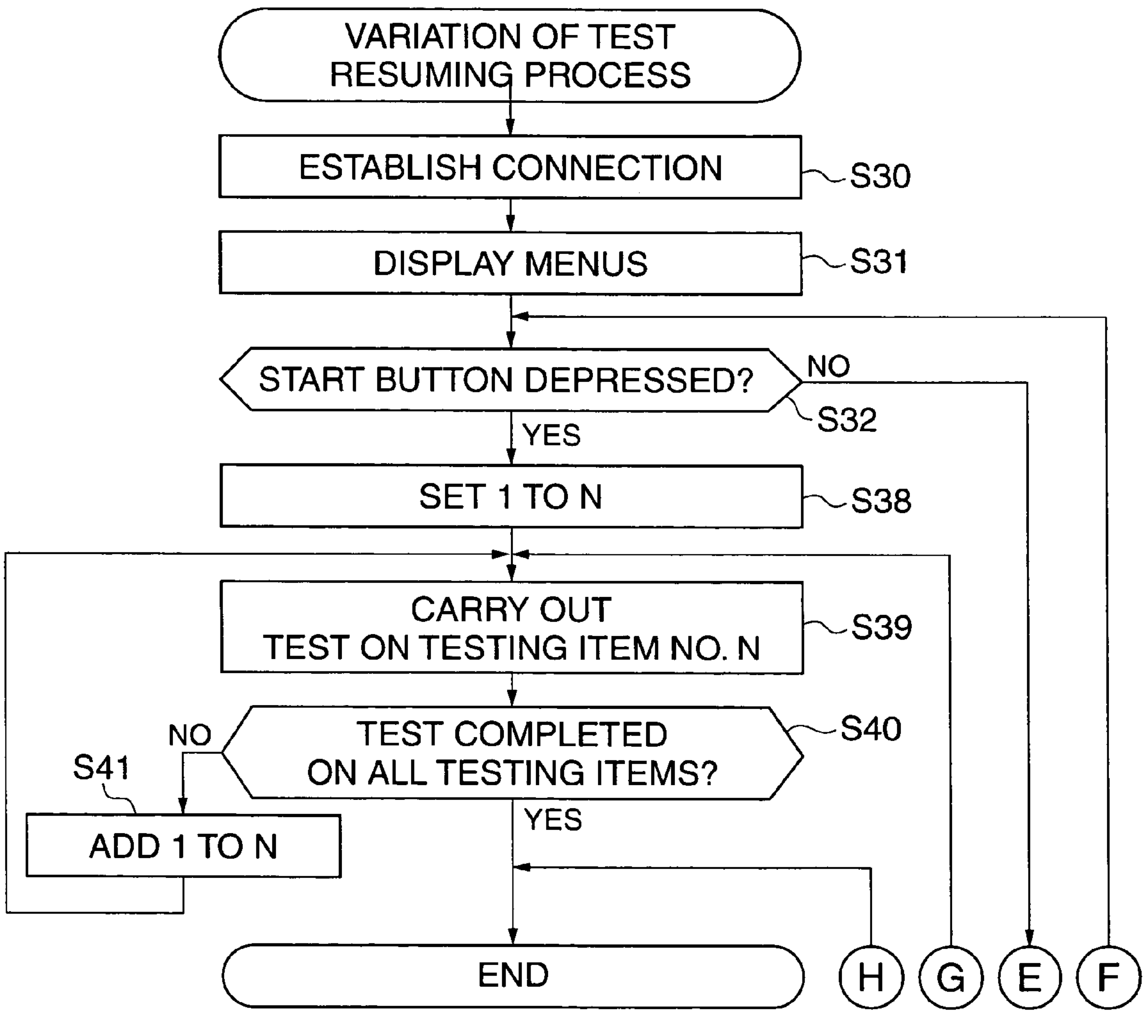
FIGS. 6A and 6B are flow chart showing a variation of the test resuming.
Figure 6B:
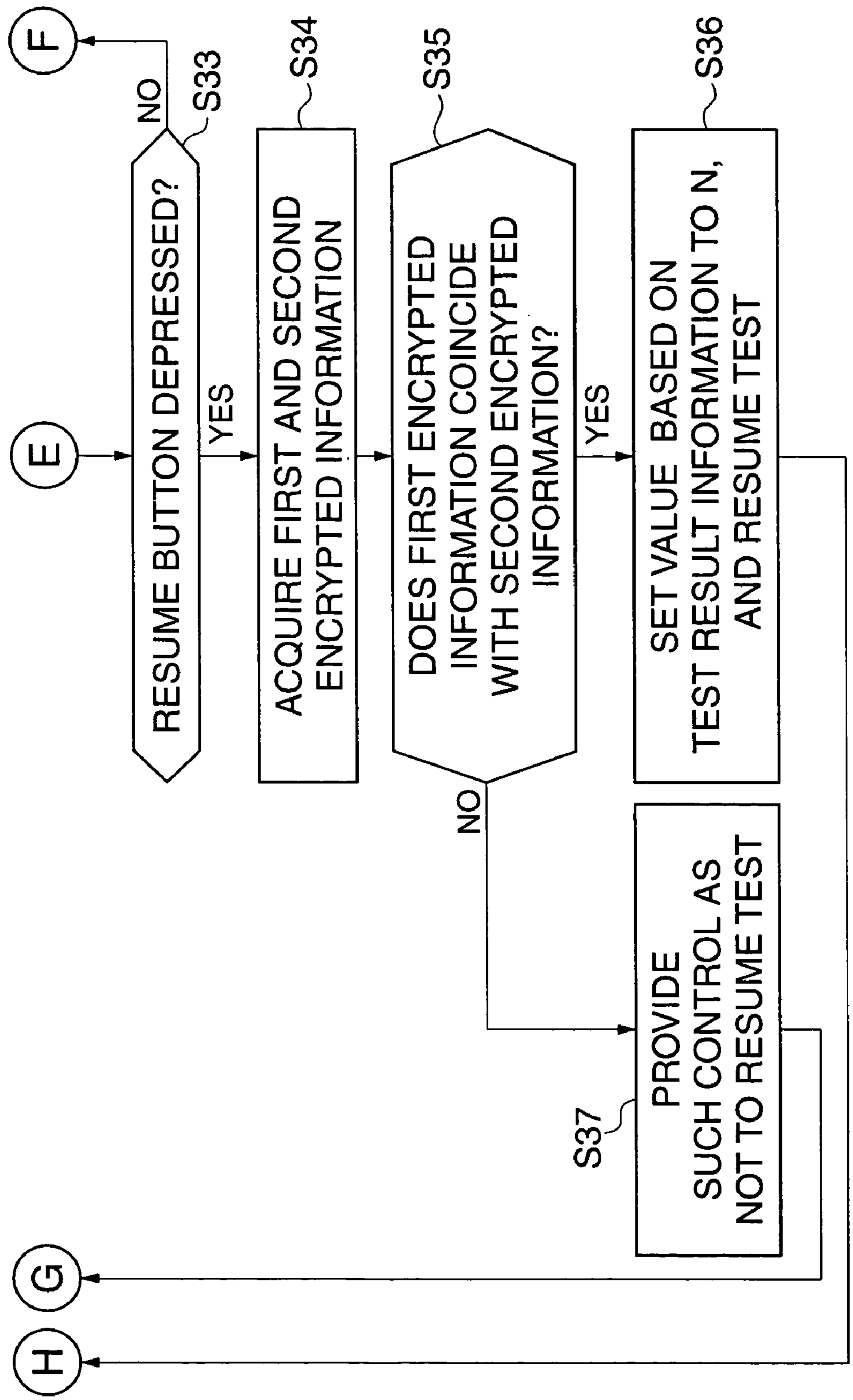

FIGS. 6A and 6B are flow chart showing a variation of the test resuming process carried out by the computer 100 appearing in FIG. 1.

In FIG. 6A, when detecting that the computer 100 and the apparatus to be tested 100 have been connected with each other via the communication cable 102 as shown in FIG. 1, the controller 107 causes the communicating section 103 to establish connection with the apparatus to be tested 100 (step S30). Then, the controller 107 causes the display section 104 to show a menu for carrying out a test starting operation and a menu for carrying out a test resuming operation (step S31), and determines whether or not the start button 202 has been depressed on the menus displayed in the display section 104 (step S32).

If, as a result of the determination in the step S32, the start button 202 has not been depressed, the controller 107 determines whether or not the resume button 201 has been depressed on the menus displayed in the display section 104 (step S33). If the resume button 201 has not been depressed, the process returns to the step S32.

If it is determined in the step S33 that the resume button 201 has been depressed, the controller 107 retrieves first encrypted information recorded in the recording section 106, and acquires second encrypted information recorded in the apparatus to be tested 101 in the step S28 in FIG. 5 (step S34). Then, the controller 107 determines whether or not the first encrypted information and the second encrypted information coincide with each other (step S35).

If it is determined in the step S35 that the first encrypted information and the second encrypted information coincide with each other, the controller 107 sets a value based on test result information recorded in the recording section 106 to the variable N, and resumes a test with a testing item No. N (step S36) to carry out the test on the testing item No. N (step S39). The controller 107 determines whether or not the test has been completed on all the testing items (n) (N≧n) (step S40). If the test has not been completed on all the testing items (N<n), the controller 107 adds 1 to the variable N (step S41) to execute the step S39 and the subsequent steps or step again, and if the test has been completed on all the testing items (N≧n), the process is terminated.

If it is determined in the step S35 that the first encrypted information and the second encrypted information do not coincide with each other, the controller 107 provides such control as not to resume the test (step S37), and the process is terminated.

If it is determined in the step 32 that the start button 202 has been depressed, the controller 107 sets 1 to the variable N (step S38). The test is comprised of a plurality of testing items No. 1 to No. n (n is an arbitrary number). Then, the controller 107 executes the step S39 and the subsequent steps or step, and the process is terminated.

Figure 7:
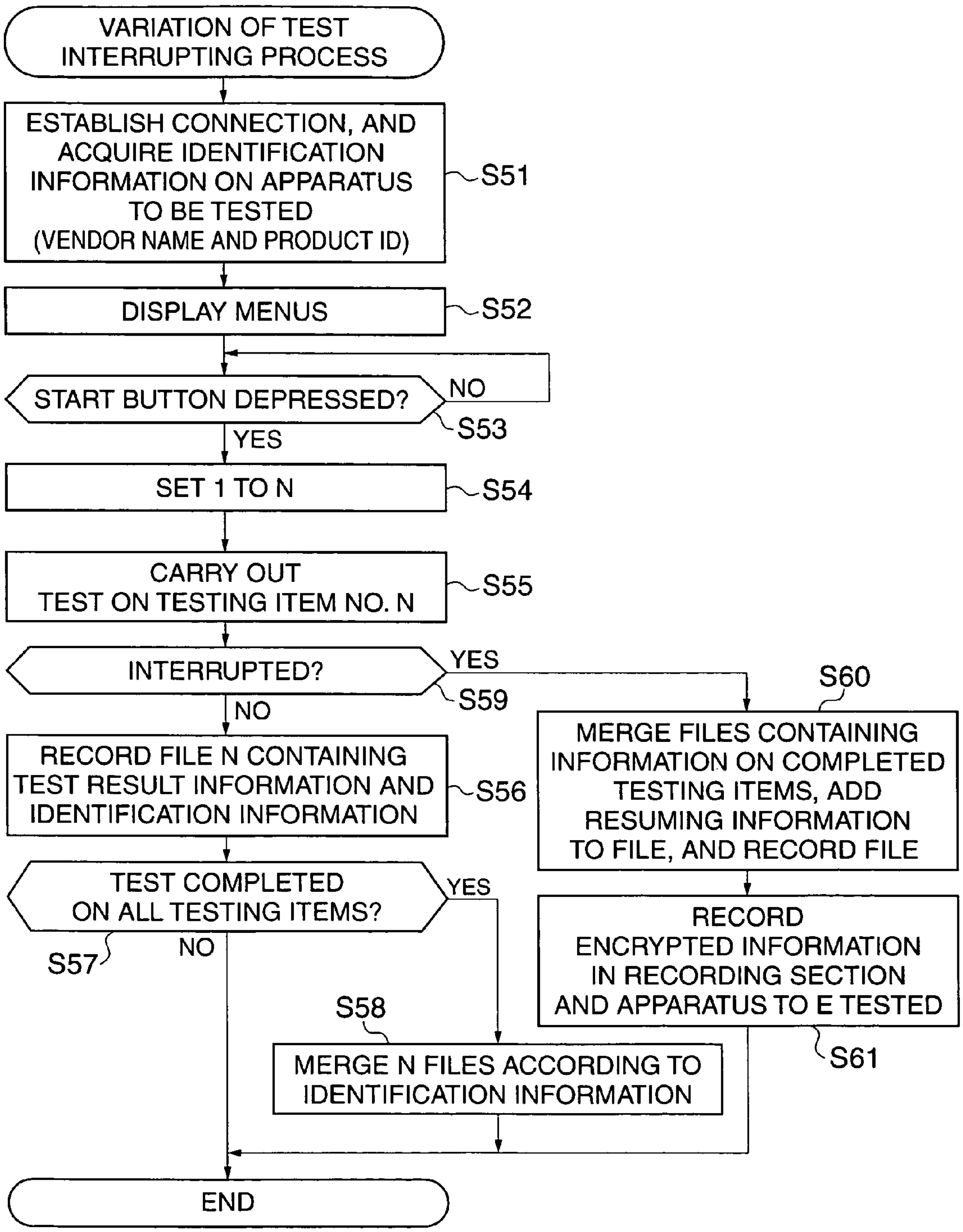
FIG. 7 is a flowchart showing another variation of the test interrupting process.

FIG. 7 is a flow chart showing another variation of the test interrupting process carried out by the computer 100 appearing in FIG. 1.

In the above described test interrupting process and variation thereof, each time a plurality of testing items have been completed or a test has been interrupted, test result information is sequentially recorded in one file. Namely, test result information on a plurality of testing items is recorded in one file. On the other hand, in the present variation, files are generated and recorded for respective testing items, and information recorded in these files are merged later to generate one test result information file.

In FIG. 7, when detecting that the computer 100 and the apparatus to be tested 100 have been connected with each other via the communication cable 102 as shown in FIG. 1, the controller 107 causes the communicating section 103 to establish connection with the apparatus to be tested 100 to acquire a vendor name and a product ID as identification information on the apparatus to be tested 101 (step S51). Then, the controller 107 causes the display section 104 to show a test menu for carrying out a test on testing items No. 1 to No. n and a menu for carrying out a test starting operation (step S52).

Then, the controller 107 determines whether or not the start button 202 has been depressed on the menus displayed in the display section 104 (step S53). If the start button 202 has been depressed, the controller 107 sets a value according to an operating instruction from the key operating section 105 to the variable N (step S54). The test is comprised of a plurality of testing items No. 1 to No. n (n is an arbitrary number). Then, the controller 107 carries out the test on a testing item No. N (step S55), and determines whether the test on the testing item No. N has been interrupted or not (step S59).

If it is determined in the step S59 that the test on the testing item No. N has been normally completed without interruption, the controller 107 records a file N containing the identification information on the apparatus to be tested 101 acquired in the step S51 in the recording section 106 (step S56), and determines whether or not the test has been completed on all the testing items (n) (N≧n) (step S57). If the test has not been completed on all the testing items (N<n), the process is terminated, and if the test has been completed on all the testing items (N≧n), the controller 107 merges N files recorded in the recording section 106 into one file according to the identification information on the apparatus to be tested 101 (step S58), and the process is terminated.

If it is determined in the step S59 that the test on the testing item No. N has been interrupted, the controller 107 merges files containing information on the completed testing items into one file according to the identification information on the apparatus to be tested 101, and adds resuming information for carrying out the test on testing items which have not yet been executed at the time of resumption among the plurality of testing items, and records the file with the resuming information added thereto in the recording section 106 (step S60). The controller 107 generates encrypted information on the apparatus to be tested 101, and records the same in each of the recording section 106 and the apparatus to be tested 101 (step S61). The process is then terminated.

The encrypted information is intended for associating test result information obtained before interruption with the concerned apparatus to be tested. For example, a hash value calculated using e.g. a hash function from generated test result information can be used as encrypted information. When a test is resumed, test result information generated by testing the apparatus to be tested can surely be used for the apparatus to be tested in which encrypted information has been recorded. Further, a test can be resumed after interruption by making reference to such test result information.

It should be noted that the test can be resumed, for example, by executing the steps S33 to S36 in FIG. 6B and then proceeding to the step S55.

The present invention may either be applied to a system composed of a plurality of apparatuses (such as a host computer, interface equipment, a reader, and a printer) or to a single apparatus (such as a copying machine or a facsimile apparatus).

Further, it goes without saying that the object of the present invention may also be accomplished by supplying a system or an apparatus with a storage medium (or a recording medium) in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Further, it goes without saying that the functions of the above described embodiment may be accomplished not only by executing the program code read out by a computer, but also by causing an OS (operating system) or the like which operates on the computer to perform a part or all of the actual operations based on instructions of the program code.

Further, it goes within saying that the functions of the above described embodiment thereof may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the program code may be implemented by an object code, a program executed by an interpreter, script data supplied to an OS, or the like insofar as the functions of the above described embodiment can be realized by the computer.

The storage medium for supplying the program code may be a RAM, an NV-RAM, a floppy (registered trademark) disk, an optical disk, a magnetic-optical disk, a CD-ROM, an MO, a CD-R, a CD-RW, a DVD (a DVD-ROM, a DVD-RAM, a DVD−RW, or a DVD+RW), a magnetic tape, a nonvolatile memory card, or a ROM, insofar as the program code can be stored. Alternatively, the program code may be supplied by downloading from another computer, a database, or the like, not shown, connected to the Internet, a commercial network, or a local area network.

What is claimed is:

1. A testing apparatus connected to an apparatus to be tested, for testing the apparatus to be tested, comprising:

an acquisition device that acquires identification information for identifying the apparatus to be tested;

a testing device that carries out a test comprising a plurality of testing items to be executed on the apparatus to be tested; and a recording device operable when the test is interrupted, to record resuming information for carrying out the test on unexecuted testing items among the plurality of testing items, and the identification information acquired by said acquisition device.

2. A testing apparatus according to claim 1, wherein said recording device records encrypted information in each of the testing apparatus and the apparatus to be tested.

3. A testing apparatus according to claim 1, further comprising:

a second acquisition device that acquires identification information on the apparatus to be tested when resuming the interrupted test;

a determination device that determines whether the identification information recorded by said recording device and the identification information acquired by said second acquisition device coincide with each other; and a resuming device that resumes the test according to the resuming information when the identification information recorded by said recording device and the identification information acquired by said second acquisition device coincide with each other.

4. A testing apparatus according to claim 2, further comprising a determination device that determines whether to resume the interrupted test according to the encrypted information recorded in the testing apparatus and the encrypted information recorded in the apparatus to be tested.

5. A testing apparatus according to claim 1, further comprising a second recording device operable when the test has been completed on one testing item among the plurality of testing items, to record a test result on the one testing item.

6. A method of controlling a testing apparatus, which is connected to an apparatus to be tested, for testing the apparatus to be tested, comprising:

an acquisition step of acquiring identification information for identifying the apparatus to be tested;

a testing step of carrying out a test comprising a plurality of testing items to be executed on the apparatus to be tested; and a recording step of recording resuming information for carrying out the test on unexecuted testing items among the plurality of testing items, and the identification information acquired in said acquisition step when the test is interrupted.

7. A method of controlling a testing apparatus according to claim 6, wherein said recording step comprises recording encrypted information in each of the testing apparatus and the apparatus to be tested.

8. A method of controlling a testing apparatus according to claim 6, further comprising:

a second acquisition step of acquiring identification information on the apparatus to be tested when resuming the interrupted test;

a determination step of determining whether the identification information recorded in said recording step and the identification information acquired in said second acquisition step coincide with each other; and a resuming step of resuming the test according to the resuming information when the identification information recorded in said recording step and the identification information acquired in said second acquisition step coincide with each other.

9. A method of controlling a testing apparatus according to claim 7, further comprising a determination step of determining whether to resume the interrupted test according to the encrypted information recorded in the testing apparatus and the encrypted information recorded in the apparatus to be tested.

10. A method of controlling a testing apparatus according to claim 6, further comprising a second recording step of recording a test result on one testing item among the plurality of testing items when the test has been completed on the one testing item.

11. A program for causing a computer to execute a method of controlling a testing apparatus which is connected to an apparatus to be tested, for testing the apparatus to be tested, comprising:

an acquisition module for acquiring identification information for identifying the apparatus to be tested;

a testing module for carrying out a test comprising a plurality of testing items to be executed on the apparatus to be tested; and a recording module for recording resuming information for carrying out the test on unexecuted testing items among the plurality of testing items, and the identification information acquired by said acquisition module when the test is interrupted.

* * * * *